United States Patent [19]
Hsiao

[11] Patent Number: 5,983,928
[45] Date of Patent: Nov. 16, 1999

[54] GAS SAFETY VALVE

[76] Inventor: Chi-Chen Hsiao, 531, Pei-Shin St., Chia Yi City, Taiwan

[21] Appl. No.: 09/158,897

[22] Filed: Sep. 23, 1998

[51] Int. Cl.$^6$ ............................. F16K 15/00; F16K 17/00
[52] U.S. Cl. ...................... 137/519.5; 137/519; 137/460
[58] Field of Search ................................ 137/519.5, 519, 137/460, 71, 517

[56] References Cited

U.S. PATENT DOCUMENTS

| | | | |
|---|---|---|---|
| 3,154,350 | 10/1964 | Majanovic | 137/519.5 |
| 3,683,957 | 8/1972 | Sands | 137/460 |
| 3,766,940 | 10/1973 | Mason | 137/519.5 |
| 4,010,770 | 3/1977 | Peters | 137/460 |
| 4,269,223 | 5/1981 | Carter et al. | 137/460 |
| 4,349,042 | 9/1982 | Shimizu | 137/460 |
| 4,830,046 | 5/1989 | Holt | 137/460 |
| 5,215,113 | 6/1993 | Terry | 137/460 |

*Primary Examiner*—Denise L. Ferensic
*Assistant Examiner*—Joanne Y. Kim
*Attorney, Agent, or Firm*—Larson & Taylor

[57] ABSTRACT

A gas safety valve includes a main body having a longitudinal through hole that defines a gas passage. The longitudinal hole has an inlet end communicated with a gas source, an outlet end through which gas from the gas source exits, a first mediate section adjacent to the outlet end, and a second mediate section between the first mediate section and the inlet end. A spring is mounted in the first mediate section, and a ball is movably mounted in the second mediate section. The first mediate section has a diameter greater than that of the outlet end, while the second mediate section has a diameter greater than that of the first mediate section such that the ball is capable of partially protruded into the first mediate section to block the gas passage defined by the longitudinal through hole. When no gas leakage occurs, a pressure difference between two ends of the ball is relatively small and thus forces the ball to a position not blocking the gas passage. To the contrary, when gas leakage occurs, the pressure difference between the two ends of the ball is relatively high and thus forces the ball to move toward the outlet end of the main body and thus blocks the gas passage by partially protruding into the first mediate section.

3 Claims, 3 Drawing Sheets

GAS SAFETY VALVE

BACKGROUND OF THE INVENTION

1. Field of the Invention

The present invention relates to an improved gas safety valve that can be applied to gas sources of different pressure.

2. Description of the Related Art

A wide variety of gas safety valves have been disclosed. For example, FIG. 4 of the drawings discloses a conventional safety valve that includes a body 1' having a conic section 11' for receiving a ball 3'. When gas leakage occurs, the ball 3' is moved from a position shown by the phantom lines to another position shown by the solid lines and thus blocks the gas passage. Nevertheless, if the pressure of the gas source changes, the dimension of the ball, the diameter of the gas passage, and the slope of the conic section have to be modified. As a result, the manufacturers have to produce safety valves of different specifications by numerous molds, which is extremely expensive and inconvenient. The present invention is intended to provide an improved gas safety valve to solve this problem.

SUMMARY OF THE INVENTION

It is a primary object of the present invention to provide an improved gas safety valve that may be used for sources of different pressure.

A gas safety valve in accordance with the present invention comprises a main body including a longitudinal through hole that defines a gas passage. The longitudinal hole has an inlet end communicated with a gas source, an outlet end through which gas from the gas source exits, a first mediate section adjacent to the outlet end, and a second mediate section between the first mediate section and the inlet end. A spring is mounted in the first mediate section, and a ball is movably mounted in the second mediate section. The first mediate section has a diameter greater than that of the outlet end, while the second mediate section has a diameter greater than that of the first mediate section such that the ball is capable of partially protruded into the first mediate section to block the gas passage defined by the longitudinal through hole.

When no gas leakage occurs, a pressure difference between two ends of the ball is relatively small and thus forces the ball to a position not blocking the gas passage. To the contrary, when gas leakage occurs, the pressure difference between the two ends of the ball is relatively high and thus forces the ball to move toward the outlet end of the main body and thus blocks the gas passage by partially protruding into the first mediate section.

An engaging member is mounted around the main body to sealingly connect the main body to the gas source. The inlet end of the main body may include a restraining member mounted therein, the restraining member including an inlet communicated with the gas source and an outlet end that is not blockable by the ball. When the gas source has a higher pressure, the spring is selected to have greater elastic constant.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
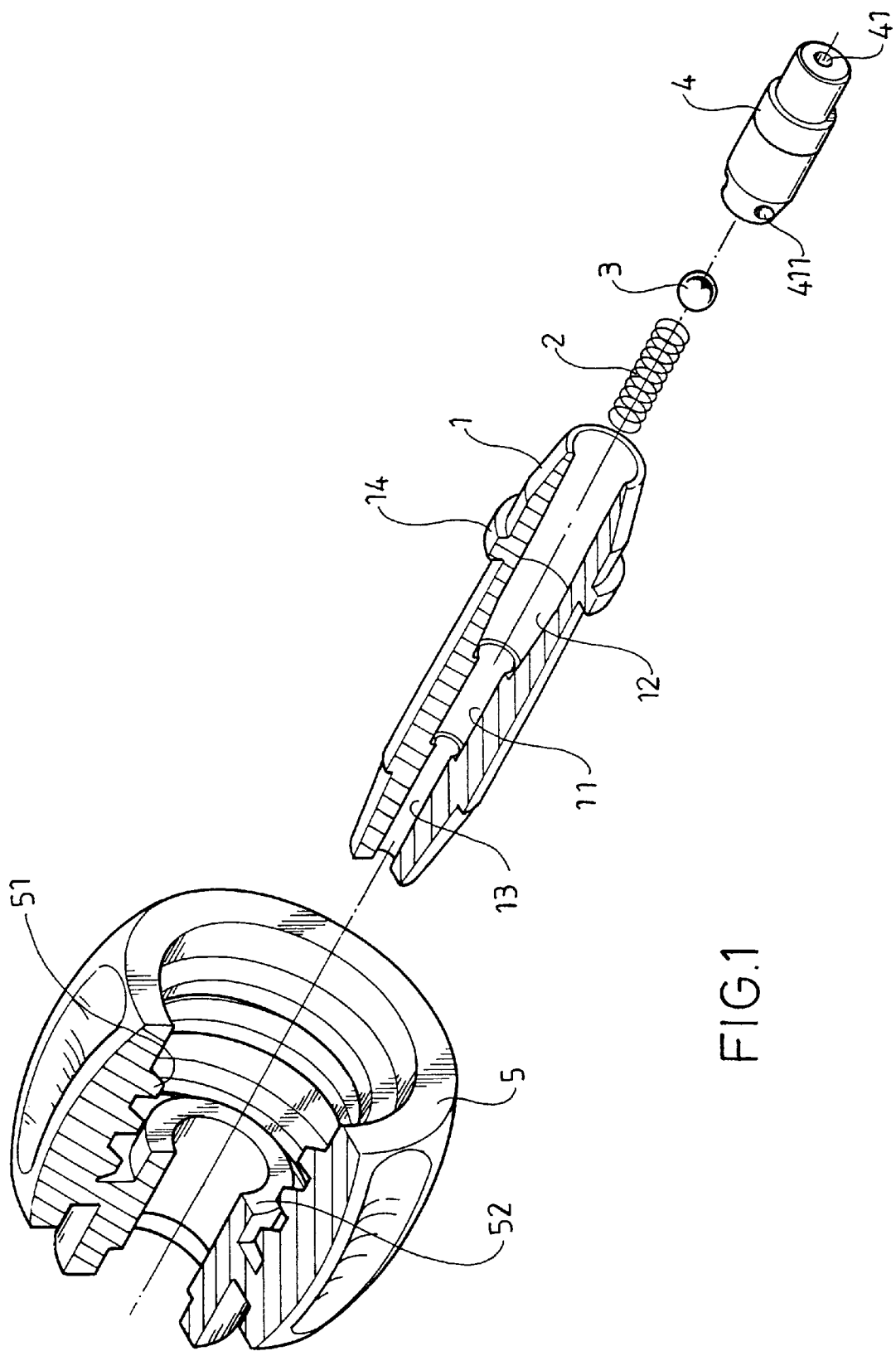
FIG. 1 is an exploded perspective view of a gas safety valve in accordance with the present invention.
Figure 2:
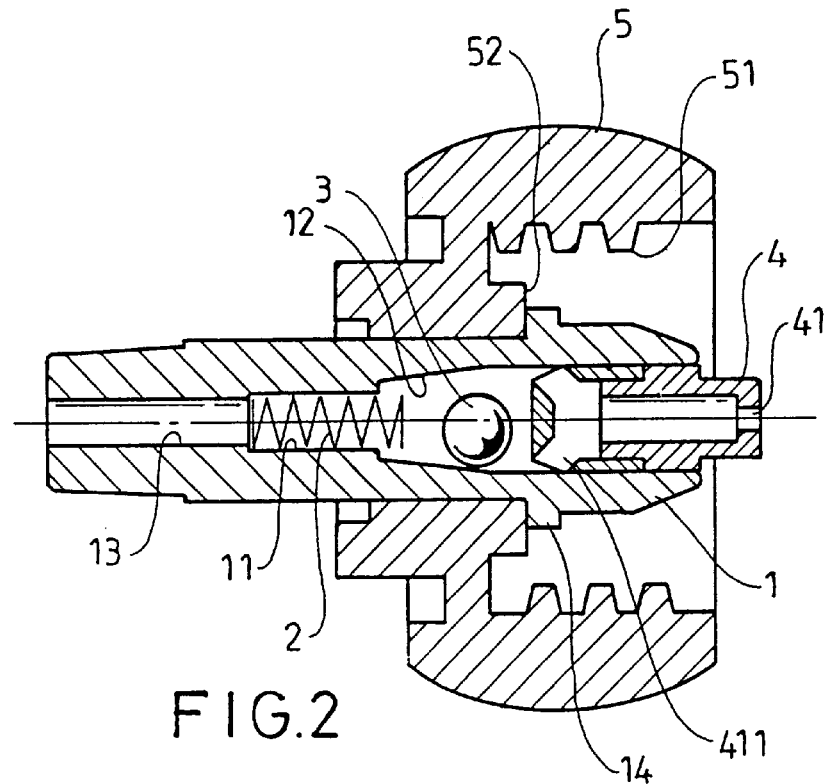
FIGS. 2 and 3 are longitudinal sectional views illustrating operation of the gas safety valve in accordance with the present invention.

Referring to FIGS. 1 and 2, a gas safety valve in accordance with the present invention generally includes a main body 1 including a longitudinal through hole, a spring 2, a ball 3, and a restraining member 4. The longitudinal through hole includes an inlet end for engaging with the restraining member 4, an outlet end 13, a first mediate section 11 adjacent to the outlet end 13 for receiving the spring 2, and a second mediate section 12 between the first mediate section 11 and the inlet end. As shown in FIG. 2, the first enlarged mediate 11 has a diameter greater than that of the outlet end 13 and includes a shoulder (not labeled) to which an end of the spring 2 is attached. The second mediate section 12 has a diameter greater than that of the first mediate section 12 such that the ball 3 can be partially protruded into the first mediate section 11 to block a gas passage defined by the longitudinal through hole.

Still referring to FIG. 2, the restraining member 4 includes an inlet 41 communicated with a gas source (not shown) and an outlet end 411 that does not face the ball 3, i.e., the ball 3 cannot block the outlet end 411 of the restraining member 4. An engaging member 5 is provided to sealingly engage the main body 1 to the gas source. In this embodiment, the engaging member 5 includes an inner threading 51 for threadedly engaging with an outer threading (not shown) on an outlet end (not shown) of the gas source. In addition, an O-ring (not shown) may be provided to a flange 52 in the engaging member 5 to assure the sealing effect.

Figure 3:
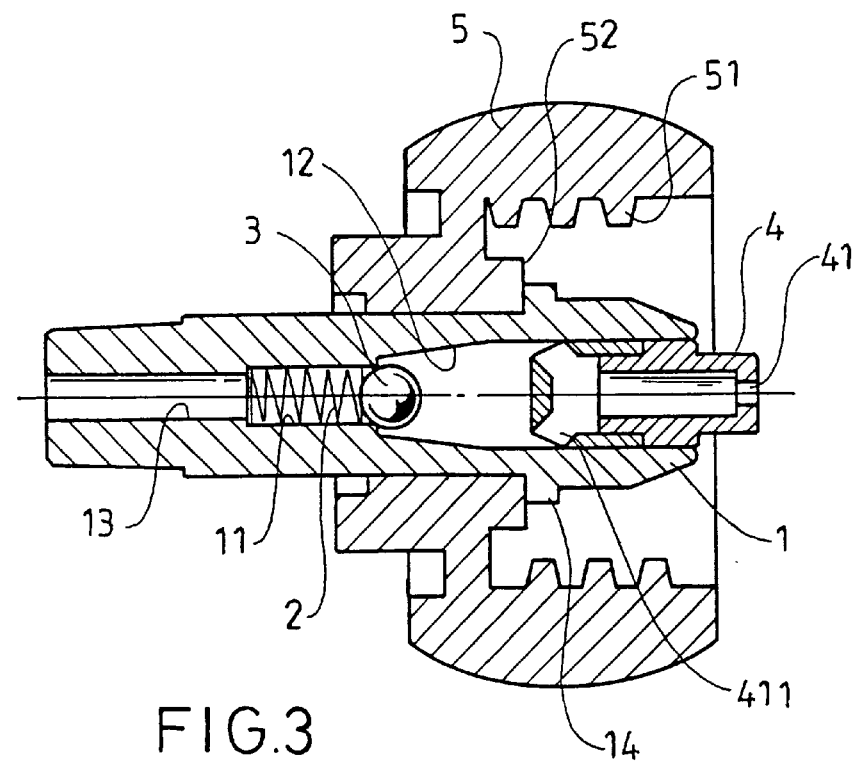
Figure 4:
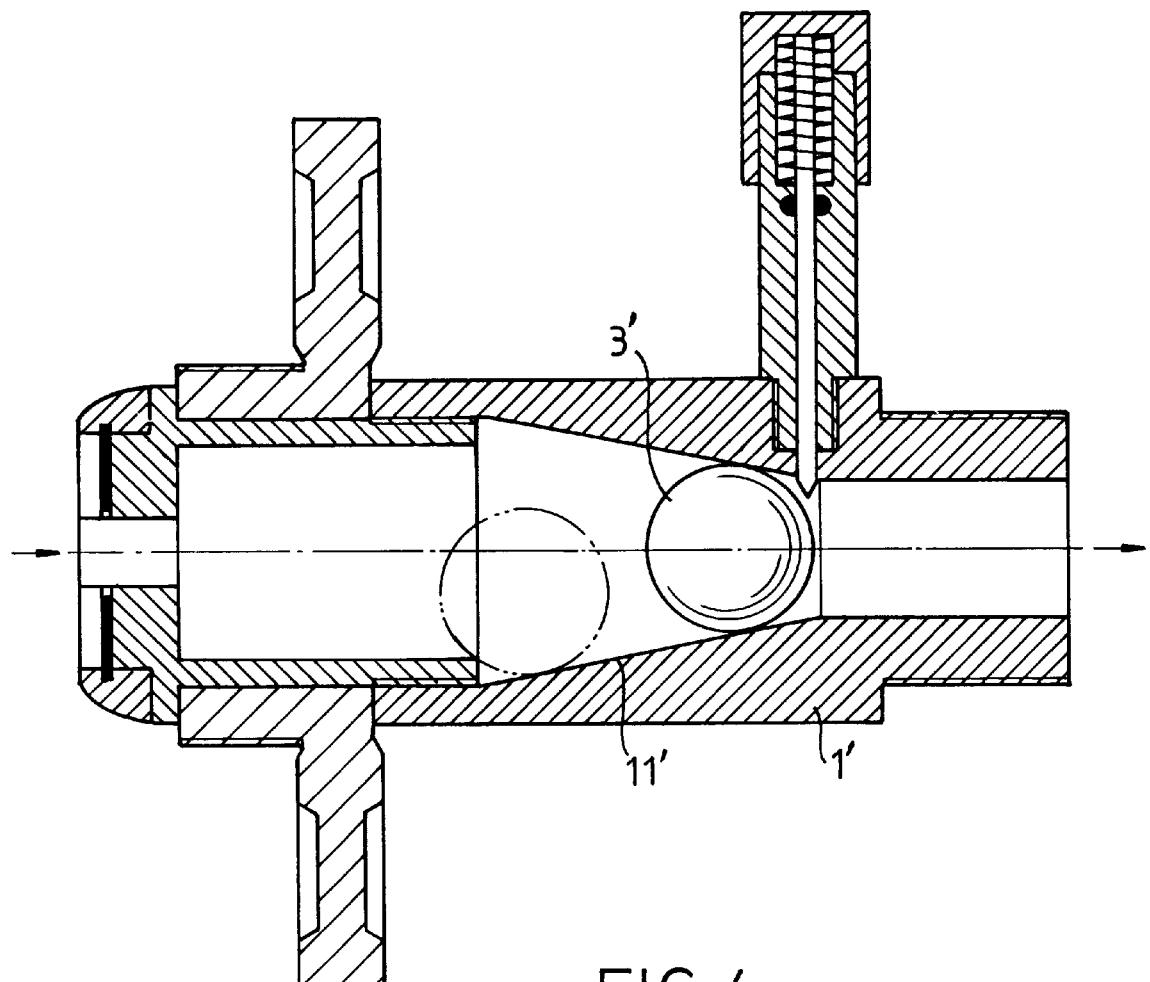
FIG. 4 is a sectional view of a conventional gas safety valve.

In use, when no gas leakage occurs, a pressure difference between two ends of the ball 3 is relatively small and thus forces the ball 3 to a position not blocking the gas passage, as shown in FIG. 2. To the contrary, if gas leakage occurs, the pressure difference between the two ends of the ball 3 is relatively high and thus forces the ball 3 to move toward the outlet end 13 of the main body, 1, as shown in FIG. 3. As a result, the gas passage is blocked to cut off supply of gas from the gas source.

For a gas source of a greater pressure, the spring 2 may be selected to have a greater elastic constant. Namely, the gas safety valve of the present invention can be applied to gas sources of different pressure by means of simply changing the spring 2.

Although the invention has been explained in relation to its preferred embodiment, it is to be understood that many other possible modifications and variations can be made without departing from the spirit and scope of the invention as hereinafter claimed.

What is claimed is:

1. A gas safety valve comprising a main body including a longitudinal through hole that defines a gas passage, the longitudinal hole having an inlet end adapted to be communicated with a gas source, an outlet end through which gas from the gas source exits, a first mediate section having smooth walls adjacent to the outlet end and including a shoulder integral therewith to which an end of the spring is attached, and a second mediate section between the first mediate section and the inlet end, a spring being mounted in the first mediate section, and a ball being movably mounted in the second mediate section, the first mediate section having a diameter greater than that of the outlet end, the second mediate section having a diameter greater than that of the first mediate section such that the ball is capable of partially protruding into the first mediate section to block the gas passage defined by the longitudinal through hole, a restraining member including an inlet communicated with the gas source and an outlet end that is unblockable by the ball such that a flow path of said outlet end of said retaining member is misaligned from said longitudinal through hole, whereby when no gas leakage occurs, a pressure difference between two ends of the ball is relatively small and thus forces the ball to a position not blocking the gas passage, and when gas leakage occurs, the pressure difference between the two ends of the ball is relatively high and thus forces the ball to move toward the outlet end of the main body and thus blocks the gas passage by partially protruding into the first mediate section.

2. The gas safety valve as claimed in claim 1, further comprising an engaging member mounted around the main body to sealingly connect the main body to the gas source.

3. The gas safety valve as claimed in claim 1, wherein when the gas source has a higher pressure, the spring is selected to have greater elastic constant.

\* \* \* \* \*